United States Patent [19]

Morioka

[11] Patent Number: 4,952,221
[45] Date of Patent: Aug. 28, 1990

[54] GAS CLEANING APPARATUS CONTAINING A CENTRIFUGAL TYPE PAINT MIST SEPARATOR

[75] Inventor: Koji Morioka, Tokyo, Japan

[73] Assignee: Taikisha Ltd., Tokyo, Japan

[21] Appl. No.: 455,918

[22] Filed: Dec. 21, 1989

Related U.S. Application Data

[63] Continuation of Ser. No. 269,561, Nov. 10, 1988, abandoned.

[30] Foreign Application Priority Data

Apr. 21, 1988 [JP] Japan .................................. 63-98787

[51] Int. Cl.⁵ ............................................. B01D 47/00
[52] U.S. Cl. ................................ 55/240; 55/DIG. 46;
98/115.2; 261/112.1
[58] Field of Search ................. 55/240, 461, DIG. 46;
98/115.2; 261/112.1

[56] References Cited

U.S. PATENT DOCUMENTS

| | | | |
|---|---|---|---|
| 3,920,422 | 11/1975 | Pircon .................... | 55/240 |
| 4,257,784 | 3/1981 | Gebhard et al. ........... | 55/84 |
| 4,298,367 | 11/1981 | Descolas ................. | 55/240 |
| 4,350,506 | 9/1982 | Otto ..................... | 55/241 |
| 4,399,742 | 8/1983 | Dobias ................... | 55/240 |
| 4,664,061 | 5/1987 | Morioka et al. .......... | 55/DIG. 46 |
| 4,783,257 | 11/1988 | Morioka et al. .......... | 55/DIG. 46 |

FOREIGN PATENT DOCUMENTS

| | | |
|---|---|---|
| 1081451 | 7/1980 | Canada ............................... 98/115.2 |
| 2940180 | 4/1981 | Fed. Rep. of Germany .... 55/DIG. 46 |
| 55-6427 | 2/1980 | Japan . |
| 743704 | 6/1980 | U.S.S.R. .......................... 55/DIG. 46 |
| 1219164 | 3/1986 | U.S.S.R. ............................. 98/115.2 |
| 669226 | 4/1952 | United Kingdom .............. 98/115.2 |
| 2110952 | 6/1983 | United Kingdom . |
| 2156238 | 10/1985 | United Kingdom ......... 55/DIG. 46 |

Primary Examiner—Jay H. Woo
Assistant Examiner—C. Scott Bushey
Attorney, Agent, or Firm—Webb, Burden, Ziesenheim & Webb

[57] ABSTRACT

A centrifugal separator type paint mist containing gas cleaning apparatus having a concave guide face extending downwardly from a downstream side end of a cleaning liquid flow-down face in a flowing down direction of cleaning liquid, the concave guide face being formed as a curved arc, a discharge guide face disposed at a downstream side end of the concave guide face for laterally discharging the cleaning liquid, a gas orienting face for orienting a paint mist containing gas fed from the upperside towards the concave guide face, whereby the paint mist containing gas is discharge through a discharge opening formed between a downstream side end of the gas orienting face and a portion of the concave guide face most adjacent the downstream side end of the gas orienting face, the discharge opening having a width smaller than an average radius of the concave guide face, the paint mist containing gas being discharge in a direction substantially along a tangential line of the concave guide face, the discharge opening is disposed with a slope in such a way that the tangential line of the concave guide face forms an angle relative to the horizontal line with the angle being larger than 45 degress and smaller than 90 degrees.

3 Claims, 5 Drawing Sheets

GAS CLEANING APPARATUS CONTAINING A CENTRIFUGAL TYPE PAINT MIST SEPARATOR

This is a continuation of copending application(s) Ser. No. 07/269,561 filed on Nov. 10, 1988 now abandoned.

BACKGROUND OF THE INVENTION (1) Field of the Invention

The present invention relates to a centrifugal separator type paint mist containing gas cleaning apparatus to be installed in e.g. a painting booth, and more particularly to a cleaning apparatus of the above-noted type comprising a concave guide face extending downwardly from a downstream side end of a cleaning liquid flow-down face in a flowing down direction of cleaning liquid, the concave guide face being formed as a curved arcate face, a discharge guide face disposed at a downstream side end of the concave guide face for laterally discharging the cleaning liquid, a gas orienting face for orienting a paint mist containing gas fed from the upperside towards the concave guide face, whereby the paint mist containing gas is discharged through a discharge opening formed between a downstream side end of the gas orienting face and a portion of the concave guide face most adjacent the downstream side end of the gas orienting face, the discharge opening having a width smaller than an average radius of the concave guide face, the paint mist containing gas being discharged in a direction substantially along a tangential line of the concave guide face.

(2) Description of the Prior Art

Figure 7:
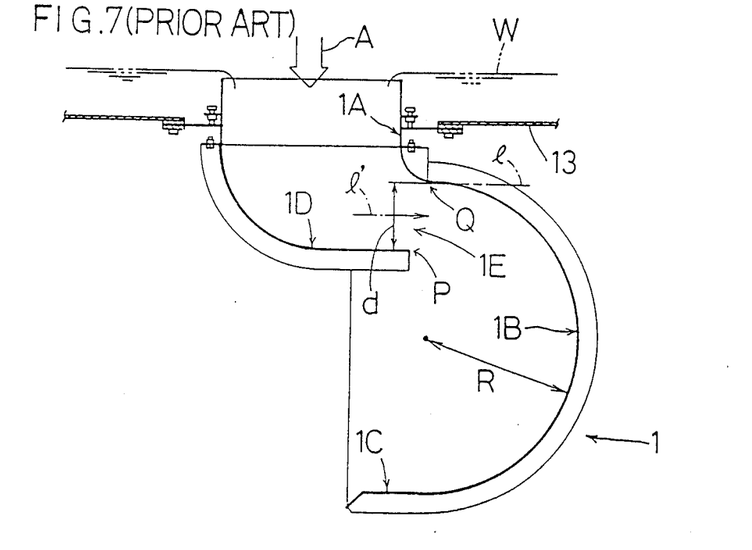
FIG. 7 is a section view showing a conventional construction.
Figures 8, 9, 10:
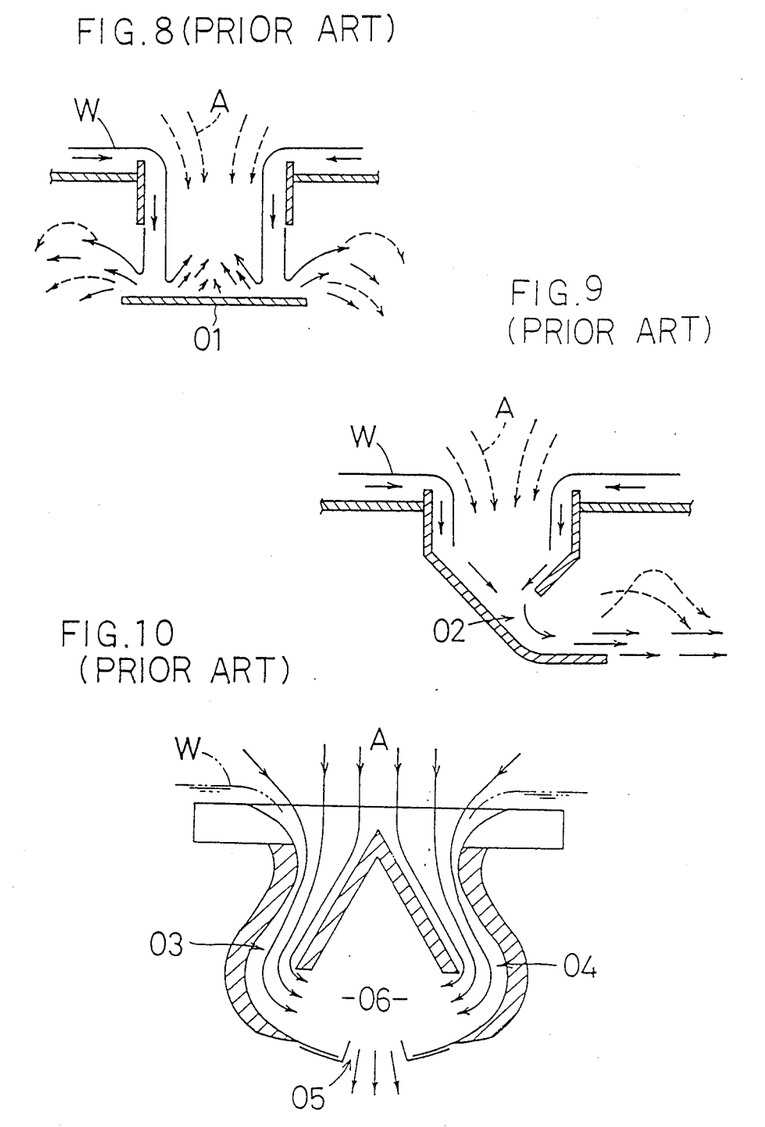
FIGS. 8 through 10 are section views respectively showing constructions of conventional apparatues of the other types.

As for the conventional paint mist containing gas cleaning apparatus, in addition to the above-described centrifugal separator type (see FIG. 7), there are also known other types as shown in FIGS. 8 through 10.

FIG. 8 shows a so-called target type, in which paint mist containing gas A and flowing-down cleaning liquid W are caused to strike at a high speed against a target plate 01 trapping the paint mist contained in the gas trapped into the cleaning liquid W (BP 2,110,952 Official Gazette). FIG. 9 shows an angularly curved flow passage type. In the case of this type, the paint mist containing gas A is caused to flow through an angularly curved flow passage 02 in which the paint mist is separated by inertia from the gas and trapped into the flowing down cleaning liquid W (BP 2,110,952 Official Gazette). FIG. 10 shows a vortex flow type. In the case of this type, the paint mist containing gas A and the flowing down cleaning liquid W are caused to flow at a high speed through a flow passage having a pair of curved flow passages 03 and 04 laterally symmetrical to each other and a constricted discharge opening 05 having a small diameter, during which one portion of the gas-liquid mixture guided by the left side curved flow passage 03 and the other portion of the gas-liquid mixture guided by the right side curved flow passage 04 are caused to collide with each other at a vortex flow chamber 06 while flowing in the form of vortex streams because of the effect of the respective curved flow passages, whereby the paint mist is trapped into the cleaning liquid W.

Aside from the above apparatus, there are also known other types of mist-containing gas cleaning apparatuses (e.g. U.S. Pat. No. 4,350,506, U.S. Pat. No. 4,257,784, USSR 628,379, Japanese published patent 55-6427).

In comparison with the above-described target type or the vortex flow type, the centrifugal type, to which the present invention relates, has the following advantages. First, there occurs less pressure loss. Second, there occurs less adhesive accumulation of the paint. Third, there is wasted less energy because of the less pressure loss. Fourth, there occurs less operating noise. Last, because of the less adhesive accumulation of the paint, even with less frequent maintenance operations, the apparatus may maintain a high paint mist collecting efficiency for a long period of time.

Further in comparison with the angularly curved flow passage type having only the angularly curved flow passage, the centrifugal separator type is advantageous in its much higher paint mist collecting efficiency.

Conventionally, the centrifugal separator type paint mist containing gas cleaning apparatus having the above-noted advantages is constructed as shown in FIG. 7 (BP 2,110,962). In this conventional apparatus, a discharge opening 1E formed between a downstream side end P of a gas orienting face 1D and a portion Q of a concave guide face 1B most adjecent the downstream side end P of the gas orienting face 1D is disposed in such a way that a tangential line l of a concave guide face 1B is formed substantially along the horizontal line or formed with an extremely small slope relative to the horizontal line.

Incidentally, in this FIG. 7, a reference mark 1A denotes a cleaning liquid flowing-down face extending continuously from an upstream side end of the concave guide face 1B, a mark 1C denotes a discharge guide face for laterally discharging the cleaning liquid W, a mark d denotes a width of the discharge opening 1E and a reference mark R denotes a radius of the arcuate concave guide face 1B, and denotes a discharge direction of paint-mist containing air A.

With all the above-described advantages over the other conventional apparatuses, the above conventional centrifugal separator type paint mist containing gas cleaning apparatus still need be improved in that there is still a tendency of the adhesive accumulation of the excess paint, though less conspicuous than the other types, at a portion of the concave guide face adjacent the discharge opening.

SUMMARY OF THE INVENTION

With view to the above-noted state of the art, it is the primary object of the present invention to provide a centrifugal separator type paint mist containing gas cleaning apparatus retaining the advantages of the cleaning apparatus of this type and further capable of more effectively avoiding the adhesive accumulation of the excess paint at the concave guide face portion in the vicinity of the discharge opening through an improvement on the structure of the discharge opening.

In order to accomplish the above object, a centrifugal separator type paint mist containing gas cleaning apparatus according to the present invention is characterized in that the discharge opening is disposed with a slope in such a way that a tangential line l of the concave guide face forms an angle $\theta$ larger than 45 degrees and smaller than 90 degrees relative to the horizontal line.

Functions and effects of the above construction will be particularly described next.

The inventor conducted various experiments on the causes of the adhesive accumulation of excess paint on the concave guide face 1B adjacent the discharge opening 1E in the conventional apparatus shown in FIG. 7. As the results, the following facts were discovered.

That is, in the case of this conventional apparatus in which the discharge opening 1E is disposed in such a way that the tangential line 1 of the concave guide face 1B is formed substantially along the horizontal line or formed with an extremely small slope-relative to the horizontal line, when the paint mist containing gas A is discharged through and departed from the discharge opening 1E, there occurs, due to the effect of the gravity, a temporary departure of the cleaning fluid W from the downwardly directed portion of the concave guide face 1B in the vicinity of the discharge opening, which liquid W need flow in the form of film along the concave guide face 1B for a proper operation. Because of this, there occurs the adhesive accumulation of the excess paint contained in the gas at the downwardly directed portion, which is not sufficiently covered with the liquid film, of the concave guide face 1B in the vicinity of the discharge opening 1E.

Figure 3:
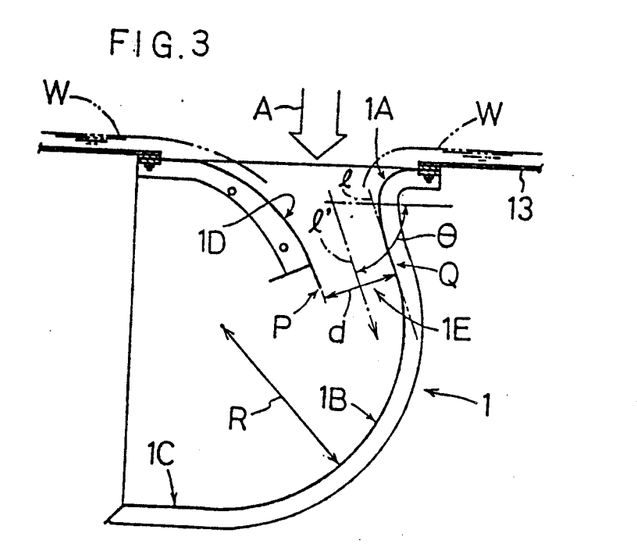

Taking the above facts into consideration, the inventor found through intensive research that the above-noted problem may be avoided if the discharge opening is disposed, as shown in FIG. 3, with a slope in such a way that the tangential line 1 of the concave guide face forms an angle $\theta$ larger than 45 degrees and smaller than 90 degrees relative to the horizontal line or more preferrably larger than 60 degrees and smaller than 75 degrees. With this arrangement, the disadvantageous effect of the gravity acting on the cleaning liquid to cause the latter to depart from the downwardly portion of the concave guide face may be reduced. Thus, the temporary departure due to the effect of the gravity of the cleaning liquid W from the downwardly directed portion of the concave guide face 1B in the vicinity of the discharge opening, may be effectively avoided. Consequently, the cleaning liquid may properly flow along the entire length of the concave guide face 1B, i.e. from the discharge opening 1E to the discharge guide face 1C.

Incidentally, the slope angle O and the width d of the discharge opening 1E should be determined within the above-described range in consideration of the flow amount of the paint mist containing gas A passing through the discharge opening 1E, the downflow amount of the cleaning liquid W, the ratio of the paint mist contained in the paint mist containing gas A and of the type of paint (i.g. viscosity or the like).

With the apparatus of the present invention having the above feature, the original advantages of the centrifugal separator type apparatus over the other types such as less adhesive accumulation of excess paint and less pressure loss are retained. And; moreover, the problem of the conventional centrifugal separator type apparatus of the partial adhesive accumulation of the paint at the portion of the concave guide face in the vicinity of the discharge opening is effectively solved. Consequently, the present invention has achieved a centrifugal separator type paint mist containing gas cleaning apparatus capable of not only achieving even less adhesive accumulation of the paint, but also of maintaining a high paint mist collecting efficiency for a long period of time even with less frequent maintenance operations.

Other and further features and advantages of the present invention will become more apparent from the following description with reference to the accompanying drawings.

BRIEF DESCRIPTION OF THE DRAWINGS

FIGS. 1 through 4 show a preferred embodiment of a paint mist containing gas cleaning apparatus related to the present invention; in which, FIG. 1 and FIG. 2 being a construction view and a perspective view showing a sample installation of the apparatus, FIGS. 3 and 4 show constructions of the apparatus with FIG. 3 being a section view and FIG. 4 being a perspective view.

DESCRIPTION OF THE PREFERRED EMBODIMENTS

Figure 1:
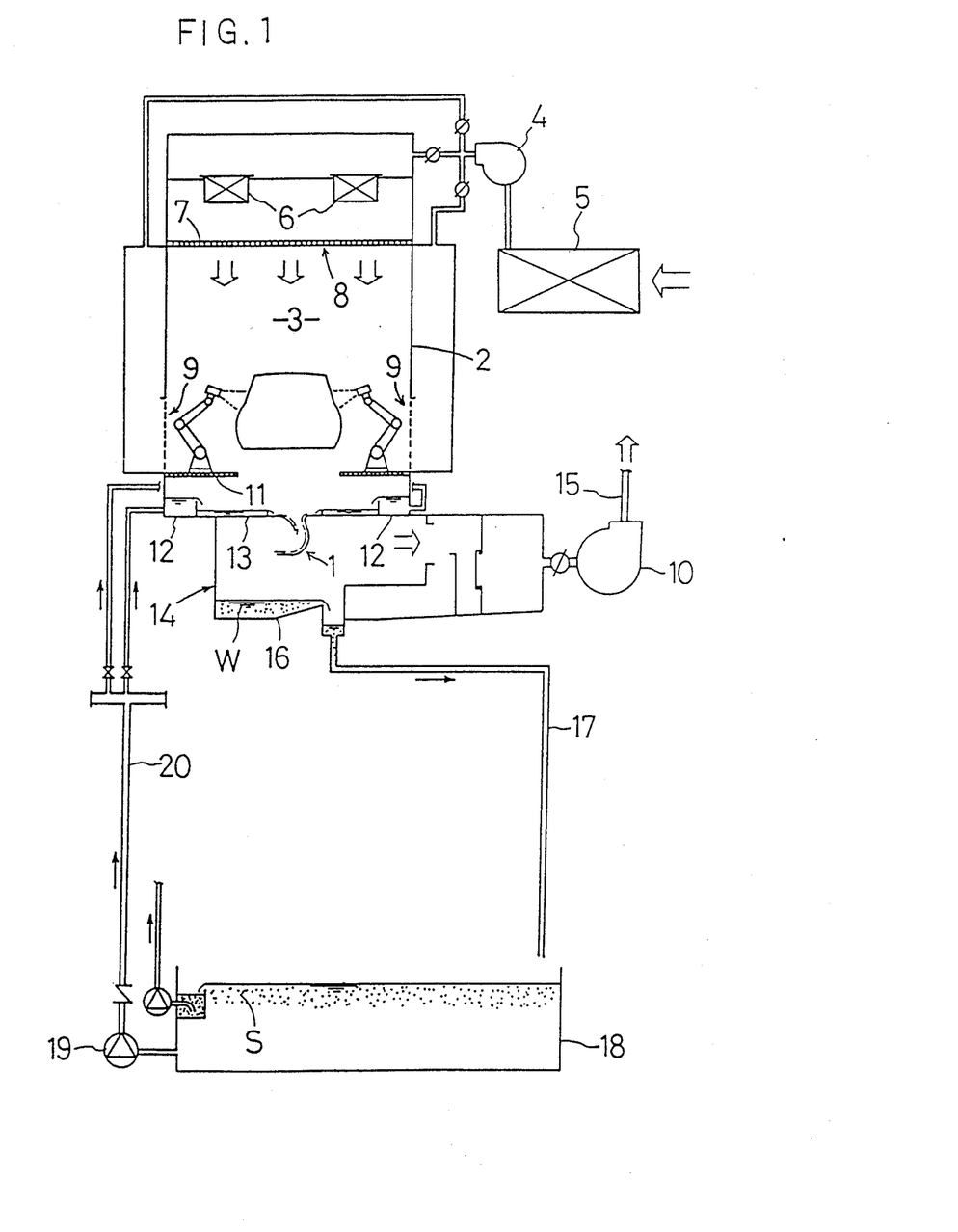
Figure 2:
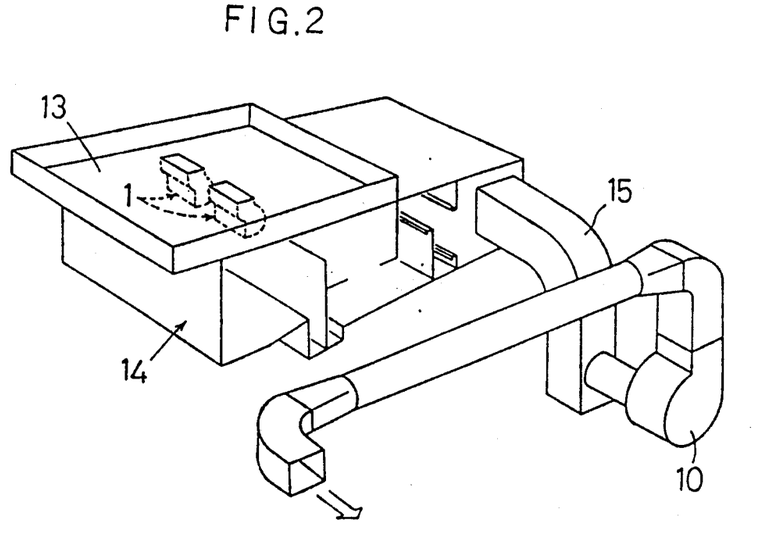

FIGS. 1 and 2 are a construction view and a perspective view showing a sample installation of a paint mist containing gas cleaning apparatus 1 related to the present invention, respectively. In these drawings, a reference numeral 2 denotes a painting booth forming a spraying work area 3, a reference numeral 4 denotes a suction fan for feeding into the painting booth 2 ventilation air of which temperature is controlled by an air-conditioner 5. After passing through a box filter, the ventilation air is supplied through a ceiling blowout opening 8 having a filter 7 into the work area 3 in the form of a downwardly directed laminar air flow, with a portion of the ventilation air being laterally supplied through a right and left pair of side blowout openings 9 into a lower region of the work area 3. A reference numeral 10 denotes an outlet fan for downwardly exhausting the air along with excess paint mist inside the work area 3 through a grating floor 11.

Under this grating floor 11, there are disposed a pan 13 for flowing down a cleaning water W overflowed from a trough 12 and a centrifugal separator type paint mist containing gas cleaning apparatus 1 positioned at a lateral center of the pan 13.

The cleaned exhaust air having its paint mist component separated and removed therefrom by its passage through the cleaning apparatus 1 goes through a draining section 14 and then is exhausted externally of the installation.

On the other hand, the cleaning water W into which the paint mist has been trapped by its passage through the cleaning apparatus 1 is received by a receiver tank 16. Then, the water W is sent through a pipe 17 into a separator tank 18, where paint residue S is separated and removed from the cleaning water W.

This cleaning water W having its paint redidue S separated and removed therefrom at the separator tank 18, is recycled by a recycling pump 19 through a pipe 20 into the trough 12.

Figure 4:
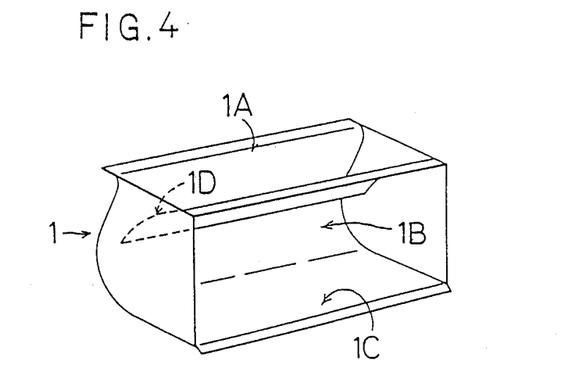

Next, the construction of the centrifugal separator tye paint mist containing air cleaning apparatus 1 will be particularly described with referece to FIGS. 3 and 4.

First, the apparatus 1 continuously forms an arcuate concave guide face 1B for the cleaning water W flowing down from the pan 13. This arcuate concave guide face 1B extends downwardly with a curve from a downstream side end of a cleaning water flow lower face 1A connected to and in fluid communication with the cleaning water pan 13 and in the flowing down direction of the cleaning water. At one downstream side end of this concave guide face 1B, there is provided an upwardly directed and horizontally positioned discharge guide face 1C for laterally discharging the guided cleaning water W. Further, there is also provided a gas orienting face 1D connected to and in fluid communication with the cleaning water pan 13 for orienting the paint mist containing air A from the upperside towards to the concave guide face 1B. Moreover, there is provided a discharge opening 1E formed between a downstream side end P of the gas orienting face 1D and a portion Q of the concave guide face 1B most adjacent the downstream side end P of the gas orienting face 1D. The gas orienting face 1D is disposed so as to discharge the paint mist containing air A through the discharge opening 1E in a direction l' substantially along a tangential line l of the concave guide face 1B.

The concave guide face 1B is formed as a large-radius arcuate face having an average radius at least more than two times larger than a width d of the discharge opening 1E. On the other hand, the gas orienting face 1D is formed as a convex curved inclined face having its slope angle relative to the horizon gradually increasing in the downstream direction.

Incidentally, a portion of the cleaning water W flowing at the left side of the drawing of the cleaning water W flowing down from the pan 13 flows down in the form of a liquid film along the gas orienting face 1D, whereby adhesive accumulation of the paint mist component to this gas orienting face 1D may be effectively and reliably prevented. The discharge opening 1E is disposed with a slope in such a way that the tangential line of the concave guide face 1B forms an angle θ relative to the horizontal line with the angle θ being larger than 45 degrees and smaller than 90 degrees, or more preferably, the angle θ being larger than 60 degrees and smaller than 75 degrees.

According to the above-described construction, in the process where the paint mist containing gas A is caused to flow at a high speed along the arcuate concave guide face 1B having the average radius R which is sufficiently larger than the width d of the discharge opening 1E, the cleaning water W is caused by the effect of the centrifugal force to flow down in the form of liquid film along the concave guide face 1B and at the same time the centrifugal effect also serves to separate by inertia the paint mist from the air. Then, the separated paint mist is trapped into the cleaning water W flowing down in the form of liquid film along the concave guide face 1B.

The above-described inclined positional arrangement of the discharge opening 1E serves to prevent the phenomenon of temporary departure due to the gravity of the cleaning water W from the concave guide face 1B in the vicinity of the discharge opening 1E. As the result, the adhesive accumulation of the excess paint to the concave guide face 1B in the vicinity of the discharge opening 1E due to such temporary departure of the cleaning liquid may be effectively and reliably avoided.

Next, alternative embodiments of the present invention will be described.

Figure 5:
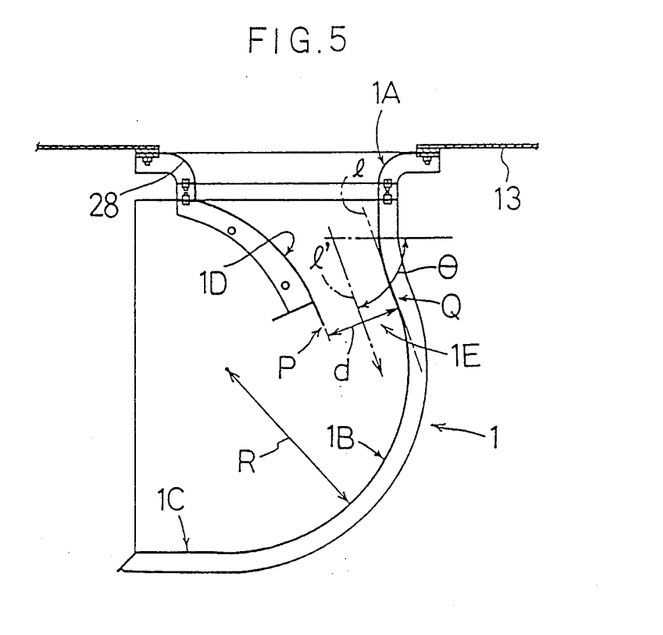
FIGS. 5 and 6 are section views respectively showing alternate embodiments of the present invention.

As shown in FIG. 5, the paint mist containing gas cleaning apparatus 1 may be attached to the pan 13 via a bell-mouth type opening frame 28. This is advantageous in that the cleaning water film may be formed more uniformly and stably on the respective guide faces.

Figure 6:
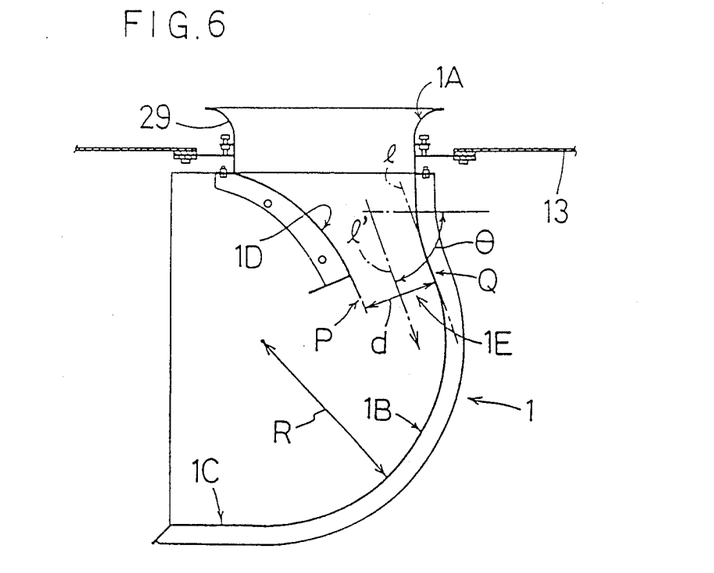

As shown in FIG. 6, it is possible to provide an overflow weir 29 for the cleaning water W flowing from the pan 13. This arrangement is advantageous in that the cleaing water W may be supplied constantly and stably even if there occurs a slight variation in the amount of water from the trough 12.

The cross sectional shape of the arcuate concave guide face 1B is not limited to the partial circle, but may be a partial oval or the like.

The specific configuration of the gas orienting face 1D may be modified in various ways.

The discharge guide face 1C may be directed upwardly with a horizontal posture or may be positioned with a slight downward slope relative to the horizon.

Also, needless to say, in place of the water used in the above embodiments, the cleaning liquid may include other chemicals by a suitable amount such as an adhesion-preventing agent or a defoaming agent for the paint mist.

It is to be understood that reference marks and numerals are provided in the following claims for the purpose of facilitating reference to the accompanying drawings but that the present invention is not limited to the construction shown in these drawings.

What is claimed is:

1. A gas cleaning apparatus containing a centrifugal type paint mist separator comprising:
    (a) a cleaning water pan carrying a cleaning liquid therein;
    (b) a concave guide face extending downwardly from a downstream end of a cleaning liquid flow-down face connected to and in fluid communication with said cleaning water pan, the concave guide face being formed as a curved arc;
    (c) a discharge guide face disposed at a downstream end of the concave guide face for laterally discharging the cleaning liquid; and
    (d) a gas orienting face for orienting a gas containing paint mist fed from the upper side of the separator towards the concave guide face, said gas orienting face connected to and in fluid communication with said cleaning water pan, whereby the gas containing paint mist is discharged through a discharge opening formed between a downstream end of said gas orienting face and a portion of said concave guide face adjacent said downstream end of said gas orienting face, said discharge opening having a width smaller than an average radius of said concave guide face, the gas containing paint mist being discharged in a direction substantially along a tangential line of said concave guide face, wherein said discharge opening is disposed with a slope in such a way that said tangential line of said concave guide face forms an angle relative to horizontal with said angle being larger than 45 degrees and smaller than 90 degrees, the width of said discharge opening being not greater than a half of the average radius of said concave guide face, and said gas orienting face comprising a convex curved inclined face having a slope relative to the horizon in the downstream direction, and with the concave guide face, and gas orienting face having their surfaces covered by said cleaning liquid.

2. A centrifugal separator type paint mist containing gas cleaning apparatus as claimed in claim 1, wherein said discharge opening is disposed upwardly of a vertical center of said concave guide face.

3. A centrifugal separator type paint mist containing gas cleaning apparatus as claimed in claim 1 or 2, wherein said angle formed between said tangential line of said concave guide face and the horizontal line is larger than 60 degrees and smaller than 75 degrees.

* * * * *

UNITED STATES PATENT AND TRADEMARK OFFICE
CERTIFICATE OF CORRECTION

PATENT NO. : 4,952,221
DATED : August 28, 1990
INVENTOR(S) : Koji Morioka

It is certified that error appears in the above-identified patent and that said Letters Patent is hereby corrected as shown below:

Abstract Line 11 "discharge" should read --discharged--.

Abstract Line 17 "discharge" should read --discharged--.

Abstract Line 22 "degress" should read --degrees-- (first occurrence).

Column 1 Line 18 "arcate" should read --arcuate--.

Column 2 Line 21 "adjecent" should read --adjacent--.

Column 2 Line 68 "results" should read --result--.

Column 3 Line 5 "slope-relative" should read --slope relative--.

Column 3 Lines 26-27 "preferrably" should read --preferably--.

Column 4 Line 16 "apparatues" should read --apparatuses--.

UNITED STATES PATENT AND TRADEMARK OFFICE
CERTIFICATE OF CORRECTION

PATENT NO. : 4,952,221

DATED : August 28, 1990

INVENTOR(S) : Koji Morioka

It is certified that error appears in the above-identified patent and that said Letters Patent is hereby corrected as shown below:

Column 4 Line 55 "redidue" should read --residue--.

Column 4 Line 60 "tye" should read --type--.

Column 5 Line 9 after "towards" delete --to--.

Column 5 Line 35 "preferrably" should read --preferably--.

Claim 1 (d) Line 57 Column 6 after "face" insert --discharge guide face,--.

Signed and Sealed this

Seventh Day of January, 1992

*Attest:*

HARRY F. MANBECK, JR.

*Attesting Officer*   *Commissioner of Patents and Trademarks*